United States Patent
Ryu et al.

(10) Patent No.: US 7,668,151 B2
(45) Date of Patent: Feb. 23, 2010

(54) TIME SYNCHRONIZING METHOD AND APPARATUS BASED ON TIME STAMP

(75) Inventors: Hyun-surk Ryu, Suwon-si (KR); Geoffrey M. Garner, Red Bank, NJ (US); Fei fei Feng, Yongin-si (KR); Cornelis Johannis Den Hollander, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 541 days.

(21) Appl. No.: 11/487,408

(22) Filed: Jul. 17, 2006

(65) Prior Publication Data

US 2007/0025481 A1    Feb. 1, 2007

Related U.S. Application Data

(60) Provisional application No. 60/699,389, filed on Jul. 15, 2005.

(30) Foreign Application Priority Data

Jun. 28, 2006    (KR) .................... 10-2006-0058479

(51) Int. Cl.
*H04J 3/06* (2006.01)
*H04L 12/28* (2006.01)
*H04L 12/56* (2006.01)

(52) U.S. Cl. ............... 370/350; 370/395.62; 370/503
(58) Field of Classification Search ............. None
See application file for complete search history.

(56) References Cited

U.S. PATENT DOCUMENTS

| | | | |
|---|---|---|---|
| 6,418,150 B1 * | 7/2002 | Staats | 370/503 |
| 6,621,832 B2 * | 9/2003 | Staats | 370/503 |
| 2001/0038674 A1 | 11/2001 | Trans | |
| 2002/0041607 A1 | 4/2002 | Spalink | |
| 2004/0109498 A1 | 6/2004 | Miller et al. | |

* cited by examiner

*Primary Examiner*—Ayaz R Sheikh
*Assistant Examiner*—Blanche Wong
(74) *Attorney, Agent, or Firm*—Sughrue Mion, PLLC

(57) ABSTRACT

Provided are a time synchronizing method and apparatus based on a time stamp. The time synchronizing method includes: transmitting a local time stamp based on a free-running local clock to a master node; receiving a response time stamp from the master node; calculating a delta time value based on the response time stamp; filtering the delta-time using a digital low pass filter running at the free-running local clock rate; and adjusting a local clock time based on the filtered delta time value.

15 Claims, 2 Drawing Sheets

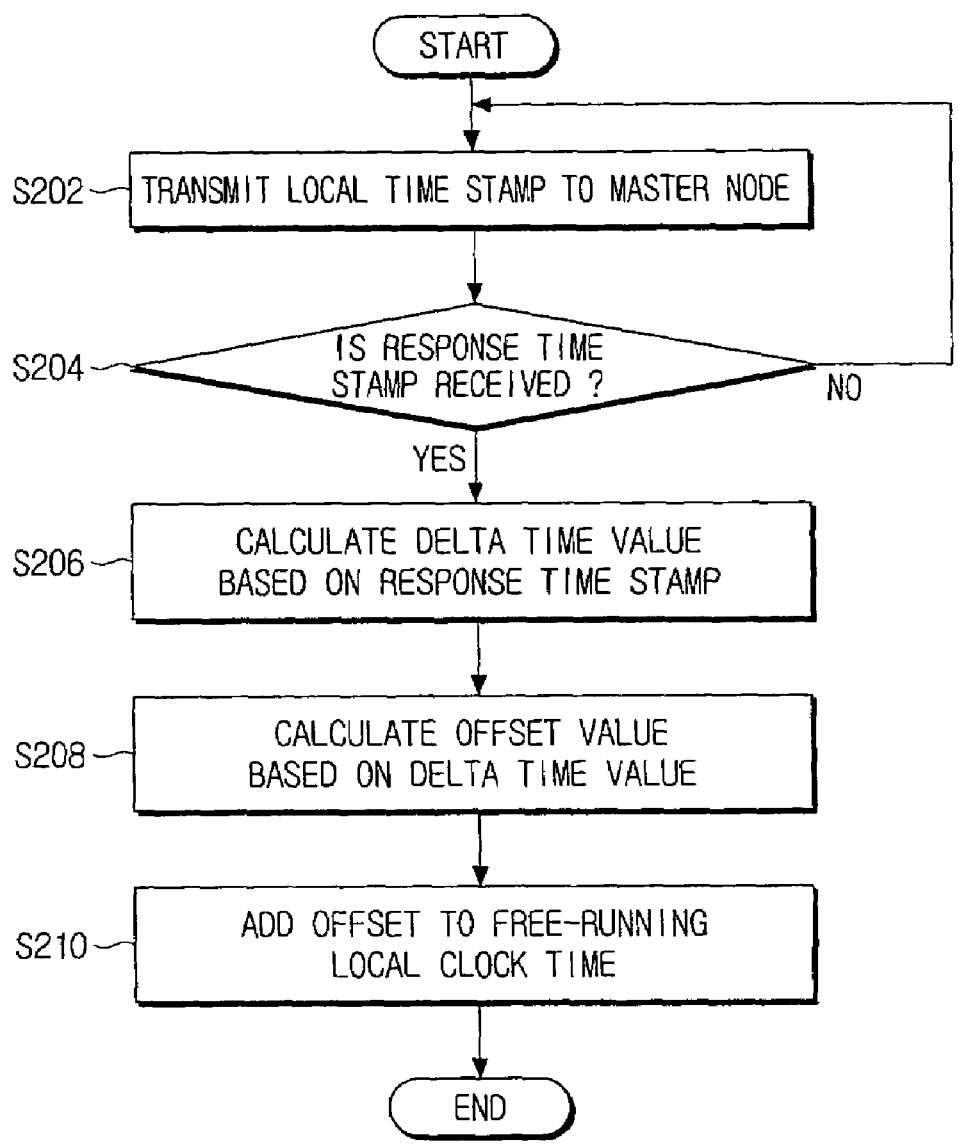

TIME SYNCHRONIZING METHOD AND APPARATUS BASED ON TIME STAMP

CROSS-REFERENCE TO RELATED APPLICATIONS

This application claims the benefit under 35 U.S.C. § 119 (a) of U.S. Provisional Patent Application No. 60/699,389, filed in the USPTO on Jul. 15, 2005, and claims priority from Korean Patent Application No. 2006-58479, filed in the Korean Patent Office on Jun. 28, 2006, the entire disclosures of which are incorporated herein by reference.

BACKGROUND OF THE INVENTION

1. Field of the Invention

Methods and apparatuses consistent with the present invention relate to time synchronizing based on a time stamp in a packet switching network, and an aspect of the invention relates to a time synchronizing method and apparatus based on a time stamp by which a delta time value and an offset value are calculated and filtered through a loop filter based on the time stamp received from a master node to a slave node to adjust a local clock time based on the delta time value and the offset value so as to synchronize a local clock of the slave node with a local clock of the master node.

2. Description of the Related Art

In general, a master node transmits a time sync message through a forwarding link in a packet switching network to provide a standard time for which all slave nodes refer to the time sync message. The time sync message includes a time stamp through which the slave nodes accurately discern when the master node transmits the time sync message. There are first and second ways of transmitting timings using such time stamps.

In the first way, one node transmits a time stamp to all nodes including slave nodes connected thereto except a master node thereof. Here, the time stamp includes a local clock value read when the time stamp is transmitted. Also, downstream clocks may synchronize with a clock of the master node but may vary due to propagation delays of the downstream clocks.

In the second way, one slave node transmits a time stamp to a master node thereof. The master node recognizes a time when the master node receives the time stamp to transmit to the slave node a response time stamp including a time when the slave node transmits the time stamp, a time when the master node receives the time stamp, and a time when the master node transmits the response time stamp. The slave node may recognize from the response time stamp with the three times a time when the slave node receives the response time stamp and synchronize with the master node, and a propagation delay may be removed due to this synchronization.

The first and second ways do not specify how the time stamps have to be used. Typically, one slave node uses time stamp information to perform an immediate phase adjustment or adjust a local clock rate. In many cases, it is a digital control oscillator (DCO) that is adjusted, i.e., the local free-running clock is used to synthesize a clock whose frequency is adjusted based on the input time stamp value. Also, the first and second ways do not specify whether time stamps are based on the free-running local clock values or the corrected values based on corrections due to previous time stamps. If the time stamps are based on the free-running local clock values, it is required that additional information containing the accumulated time stamp values from all clocks between the slave node and the master node be transmitted. If the time stamps are based on corrected clock values due to previous time stamps, the time stamps are inherently based on accumulated information. However, in the latter the case must be considered where a mode adjusts its local clock value, based on time stamp exchange with its master node, between its receipt of a time stamp from a slave and the sending of a reception of the response to the slave node.

In cases where an immediate phase adjustment is made when a time stamp is received in a slave node, the resulting timing signal contains a phase step at each adjustment. A size of the phase step depends on the clock accuracy and the frequency at which the time stamp is transmitted.

If the clock frequency tolerance is ±y (where y is a pure fraction), and the time between successive time stamps is T, then the maximum phase step is of order 2yT. For example, if y is 100 ppm and T is 10 ms, the maximum phase is 2000 ns; this is excessively large for some applications, e.g., digital video and audio transport in Residential Ethernet (i.e., Audio/Video Bridging Network). This phase step occurs in the synchronization of one slave node to its master node; this phase error will accumulate over a chain of nodes as timing is transferred and the total phase error accumulation will be somewhat larger than 2yT.

In cases where time stamps are used to adjust DCOs that are part of digital phase-locked loops (DPLLs), phase errors can accumulate as timing is transferred over a chain of nodes. The phase accumulation can be controlled by limiting the bandwidths of the DPLLs, gain peaking, and the generation of noise.

For a DCO with given inherent noise level, a narrower bandwidth will result in larger DPLL noise generation. It is also known that after traversing a number of phase-locked loops (PLLs), a phase error increases dramatically; the number of PLLs after which this happens depends on the gain peaking and is smaller for larger gain peaking.

However, use of DPLL structures with smaller gain peaking results in a more sluggish DPLL and the need for a more stable, i.e., lower noise, oscillator. Accordingly, a conventional time synchronizing method is based on larger jitter and wander accumulation or acceptable jitter and wander accumulation but possibly at the cost of a lower noise and therefore more expensive oscillator.

SUMMARY OF THE INVENTION

Accordingly, the present general inventive concept has been made to address the above-mentioned problems, and an aspect of the present general inventive concept is to provide a time synchronizing method and apparatus based on a time stamp by which a delta time value and an offset value are calculated and filtered through a loop filter based on the time stamp received from a master node to a slave node in a packet switching network to adjust a local clock time based on the delta time value and the offset value so as to synchronize a local clock of the slave node with a local clock of the master node.

According to an aspect of the present invention, there is provided a time synchronizing method based on a time stamp, including: transmitting a local time stamp based on a free-running local clock to a master node; receiving a response time stamp from the master node; calculating a delta time value based on the response time stamp; and adjusting a local clock time based on the delta time value.

The local time stamp may include a time when the local time stamp is transmitted to the master node.

The response time stamp may include a time when the local time stamp is transmitted to the master node, a time when the master node receives the local time stamp, and a time when the master node transmits the response time stamp.

The delta time value may be calculated as in the Equation below:

$$U_k = \frac{(T_{2,k}^M - T_{1,k}^S) - (T_{4,k}^S - T_{3,k}^M)}{2}$$

wherein $T_{1,k}^S$ denotes a time when the local time stamp is transmitted to the master node, $T_{2,k}^S$ denotes a time when the master node receives the local time stamp, $T_{3,k}^S$ denotes a time when the master node transmits the response time stamp, and $T_{4,k}^S$ denotes a time when the response time stamp is received from the master node.

An offset value may be calculated using the delta time value, and the local clock time may be adjusted according to the offset value.

The offset value may be calculated using the Equation below:

$$y_k = a_1 y_{k-1} + a_2 y_{k-2} + \ldots + a_n y_{k-n} + b_0 u_k + b_1 u_{k-1} + \ldots + b_m u_{k-m}$$

wherein $a_i$ and $b_i$ denote filter coefficients of a filter transmission function, $y_k$ denotes the time history of the offset, and $u_k$ denotes the time history of the delta time.

The filter transmission function may be expressed as in the Equation below:

$$H(z) = \frac{b_0 + b_1 z^{-1} + \ldots + b_m z^{-m}}{1 - a_1 z^{-1} - a_2 z^{-2} \ldots + a_n z^{-n}}$$

wherein $a_i$ and $b_i$ denote the filter coefficients.

According to another aspect of the present invention, there is provided a time synchronizing apparatus including: a slave node generating and transmitting a local time stamp based on a free-running local clock, calculating a delta time value based on a received response time stamp, and adjusting a local clock time based on the delta time value; and a master node receiving the local time stamp from the slave node, generating the response time stamp based on the local time stamp, and transmitting the response time stamp to the slave node.

The local time stamp transmitted from the slave node may include a time when the local time stamp is transmitted to the master node.

The response time stamp may include a time when the local time stamp is transmitted to the master node, a time when the master node receives the local time stamp, and a time when the master node transmits the response time stamp.

The delta time value may be calculated as in the Equation below:

$$U_k = \frac{(T_{2,k}^M - T_{1,k}^S) - (T_{4,k}^S - T_{3,k}^M)}{2}$$

wherein $T_{1,k}^S$ denotes a time when the local time stamp is transmitted to the master node, $T_{2,k}^S$ denotes a time when the master node receives the local time stamp, $T_{3,k}^S$ denotes a time when the master node transmits the response time stamp, and $T_{4,k}^S$ denotes a time when the response time stamp is received from the master node.

The slave node may calculate an offset value using the delta time value and adjust the local clock time according to the offset value.

The offset value may be calculated using the Equation below:

$$y_k = a_1 y_{k-1} + a_2 y_{k-2} + \ldots + a_n y_{k-n} + b_0 u_k + b_1 u_{k-1} + \ldots + b_m u_{k-m}$$

wherein $a_i$ and $b_i$ denote filter coefficients of a filter transmission function, $y_k$ denotes the time history of the offset, and $u_k$ denotes the time history of the delta time. The filter transmission function may be a function expressed through a combination of the filter coefficients.

The slave node may calculate the delta time value through a loop filter and combine the delta time value with a filter coefficient of the loop filter to calculate the offset value.

BRIEF DESCRIPTION OF THE DRAWINGS

The above aspects and features of the present invention will be more apparent by describing certain embodiments of the present invention with reference to the accompanying drawings, in which:

FIG. 2 is a flowchart of a time synchronizing method based on a time stamp according to an embodiment of the present invention.

DETAILED DESCRIPTION OF EXEMPLARY EMBODIMENTS

Figure 1:
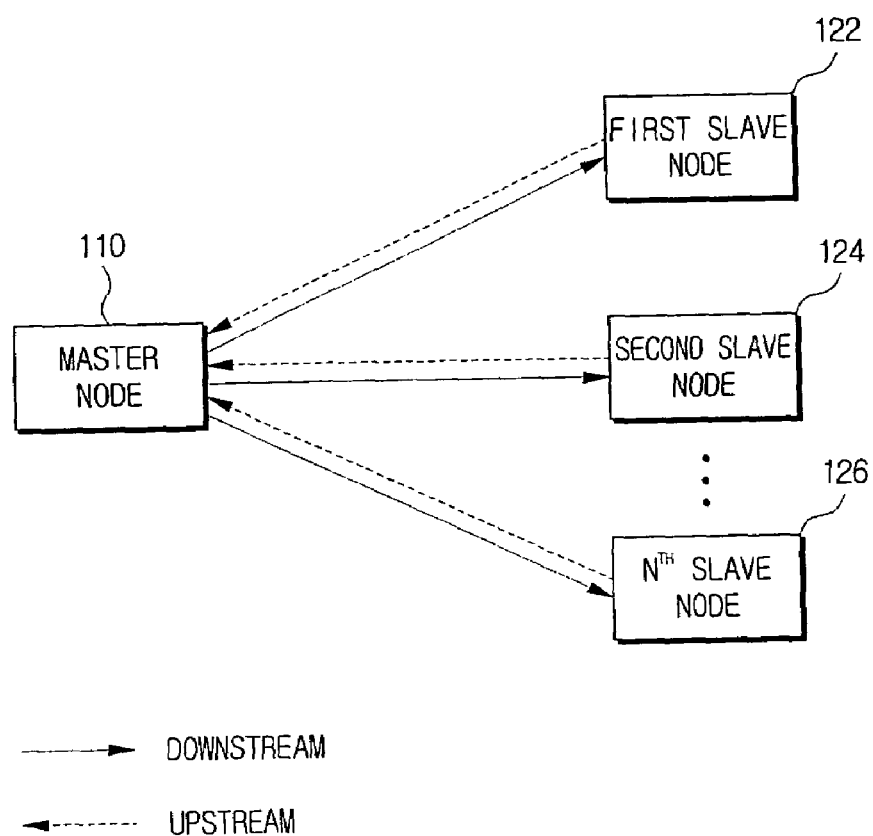
FIG. 1 is a schematic block diagram of a configuration of a packet switching network illustrating a time synchronizing method based on a time stamp according to an embodiment of the present invention.

Certain embodiments of the present invention will be described in greater detail with reference to the accompanying drawings.

In the following description, the same drawing reference numerals are used for the same elements even in different drawings. Certain matters described herein, such as construction details and other elements are merely provided to assist in a comprehensive understanding of the invention. Thus, it is apparent that the present invention can be carried out without those described matters. Also, well-known functions or constructions are not described in detail since that would obscure the invention in unnecessary detail.

A time stamp used for synchronizing will be described to assist in an understanding of the present invention.

In one approach, a time stamp is expressed in a count state of a rising 32-bit binary counter and determined by a local free-running clock of 10.24 MHz of a master or slave node. In a second approach, a time stamp is expressed as the sum of the free-running 32-bit counter value plus the currently computed offset. A general interval between sync messages is tens of ms (200 ms at a maximum). If a downstream link overhead is small, the general interval is set so that the slave node quickly obtains time synchronizing.

FIG. 1 is a schematic block diagram of a configuration of a packet switching network illustrating a time synchronizing method based on a time stamp according to an embodiment of the present invention. Referring to FIG. 1, the packet switching network includes a master node 110 and a plurality of slave nodes 122, 124, and 126.

The master node 110 receives a time stamp from a random slave node and transmits a sync message including a response time stamp to the time stamp to the corresponding slave node.

The slave nodes 122, 124, and 126 transmit local time stamps generated for local oscillation to the master node 110 to synchronize with the master node 110 and receive response time stamps from the master node 110. The slave nodes 122, 124, and 126 calculate delta time values based on the response time stamps and adjust local clock offsets through a loop filter based on the delta time values. In other words, the slave nodes 122, 124, and 126 calculate delta time values through time stamps based on free-running local clocks and time stamps based on correction of previous time stamps and synchronize with the master node 110 based on the delta time values.

The time synchronizing method according to the present embodiment uses a time stamp based on a free-running local clock, or a time stamp based on correction due to previous time stamps.

In the case of the time stamp based on the free-running local clock, when a slave node calculates a delta time value based on a change of the time stamp, the delta time value is input to a digital low pass filter (DLPF). The DLPF may be chosen to be second order with specified bandwidth and gain peaking. However, any filter design that produces equivalent desired bandwidth and gain peaking will be acceptable. When a new delta time value is calculated, based on a new time stamp exchange, that new delta time value is input to the DLPF. The state of a filter is equal to its current state based on the previous delta time value and filter response that has occurred since receiving that value. A node receives from its master node the current accumulated filtered offset value; the node adds its filtered offset value to the accumulated value and sends the total to downstream nodes.

In the case of the time stamp based on corrections due to previous time stamps, a DLPF computes a time stamp based on the current free-running clock value plus the current correction based on previous time stamps.

If a master node that is in the middle of a two-way time stamp exchange with a slave node receives a time stamp from its master node, it calculates a new delta time value between receiving the time stamp from the slave node and sending the response time stamp; the error due to the new delta time value may be small compared to the current method where no filtering is done. This is because the DLPF prevents an immediate step change in the local time value. For the error to be small, the filter time constant must be large compared to the time between the receipt of the time stamp from the slave node and the sending of the response time stamp.

A delta time value is calculated based on a response time stamp received from a master node and adjusts a local clock time based on the delta time value as in Equation 1:

$$U_k = \frac{(T_{2,k}^M - T_{1,k}^S) - (T_{4,k}^S - T_{3,k}^M)}{2} \quad (1)$$

wherein $T_{1,k}^S$ denotes a time when a slave node transmits a local time stamp to a master node, $T_{2,k}^S$ denotes a time when the master node receives the local time stamp from the slave node, $T_{3,k}^S$ denotes a time when the master node transmits a response time stamp to the slave node, and $T_{4,k}^S$ denotes a time when the slave node receives the response time stamp from the master node.

Also, although not shown, the digital low pass filter may include a multiplier, a delayer, an adder, and the like. The digital low pass filter sums a value obtained through a multiplication of a current input value by coefficient and a value obtained through a multiplication of a previously accumulated value by coefficient. The digital low pass filter uses two coefficient values to obtain a fast convergence and a small jitter value after the fast convergence. In other words, the digital low pass filter obtains the fast convergence characteristic using the larger coefficient value of the two coefficient values and reduces the jitter value using the smaller coefficient value.

The digital low pass filter also calculates an offset value using the coefficient values and the delta time value as in Equation 2:

$$y_k = a_1 y_{k-1} + a_2 y_{k-2} + \ldots + a_n y_{k-n} + b_0 u_k + b_1 u_{k-1} + \ldots + b_m u_{k-m} \quad (2)$$

wherein $a_i$ and $b_i$ denote filter coefficients of a filter transmission function, $y_k$ denotes the time history of the offset, and $u_k$ denotes the time history of the delta time.

The filter transmission function used by the digital low pass filter can be expressed as in Equation 3:

$$H(z) = \frac{b_0 + b_1 z^{-1} + \ldots + b_m z^{-m}}{1 - a_1 z^{-1} - a_2 z^{-2} \ldots + a_n z^{-n}} \quad (3)$$

FIG. 2 is a flowchart of a time synchronizing method based on a time stamp according to an embodiment of the present invention.

The slave nodes 122, 124, and 126 use time stamps to adjust local clock offsets. In operation S202, the slave nodes 122, 124, and 126 transmit local time stamps generated locally to the master node 110.

Here, the local time stamps include times when the slave nodes 122, 124, and 126 transmit the local time stamps.

The master node 110 receives the local time stamps from the slave nodes 122, 124, and 126 and generates response time stamps corresponding to the local time stamps. The master node 110 also transmits sync messages including the response time stamps to the slave nodes 122, 124, and 126.

Here, the response time stamps from the master node 110 includes times when the slave nodes 122, 124, and 126 transmit the local time stamps to the master node, times when the master node receives the local time stamps from the slave nodes 122, 124, and 126, and times when the master node transmits the response time stamps to the slave nodes 122, 124, and 126.

In operation S204, the slave nodes 122, 124, and 126 receive the sync messages including the response time stamps from the master node 110. The slave nodes 122, 124, and 126 input the response time stamps to a time stamp circuit.

In operation S206, the time stamp circuit calculates a delta time value $U_k$ using the response time stamps and a local time stamp generated based on a free-running local clock as in Equation 1 above and filters the delta time value $U_k$ using the digital low pass filter. In other words, the slave nodes 122, 124, and 126 calculate delta time values based on times when the slave nodes 122, 124, and 126 transmit the local time stamps to the master node 110, times when the master node 110 receives the local time stamps from the slave nodes 122, 124, and 126, and times when the master node 110 transmits the response time stamps to the slave nodes 122, 124, and 126.

In operation S208, the digital low pass filter calculates an offset value based on the calculated delta time value $U_k$.

In operation s210, the offset value computed by the digital low pass filter in s309 is added to the local clock time to obtain the synchronized time.

When the slave nodes 122, 124, and 126 calculate the delta time values based on changes of the time-stamps, the delta time values are input to a DLPF. A new delta time value is calculated based on the changed time stamps and previous offsets input to the DLPF. However, a state of the DLPF is equal to a current state based on a previous delta time value.

The DLPF calculates a current free-running clock offset value, which is added as a current correction to the free-running clock time.

The slave nodes 122, 124, and 126 synchronize with the master node 110 based on a time stamp based on the free-running local clock and a time stamp based on a correction of a previous time stamp.

As described above, according to the present invention, synchronizing can be achieved in a filtering way using a time stamp in a packet switching network. Thus, a PLL does not need to be used. Also, a high-priced oscillator preventing an increase in an error does not need to be used. In addition, jitter and wander of timing can be reduced.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A time synchronizing method based on a time stamp, comprising:
   transmitting a local time stamp based on a free-running local clock to a master node;
   receiving a response time stamp from the master node;
   calculating a delta time value based on the response time stamp or the local time stamp;
   filtering the delta-time value using a digital low pass filter running at the free-running local clock rate; and
   adjusting a local clock time based on the filtered delta time value,
   wherein the delta time value is calculated using at least one of a difference of a time when the master node receives the local time stamp and a time when the local time stamp is transmitted to the master node and a difference of a time when the response time stamp is received from the master node and a time when the master node transmits the response time stamp.

2. The time synchronizing method of claim 1, wherein the local time stamp comprises a time when the local time stamp is transmitted to the master node.

3. The time synchronizing method of claim 1, wherein the response time stamp comprises a time when the local time stamp is transmitted to the master node, a time when the master node receives the local time stamp, and a time when the master node transmits the response time stamp.

4. The time synchronizing method of claim 1, wherein the delta time value is calculated as in Equation below:

$$U_k = \frac{(T_{2,k}^M - T_{1,k}^S) - (T_{4,k}^S - T_{3,k}^M)}{2}$$

wherein $T_{1,k}^S$ denotes a time when the local time stamp is transmitted to the master node, $T_{2,k}^M$ denotes a time when the master node receives the local time stamp, $T_{3,k}^M$ denotes a time when the master node transmits the response time stamp, and $T_{4,k}^S$ denotes a time when the response time stamp is received from the master node.

5. The time synchronizing method of claim 1, wherein an offset value is calculated using the delta time value, and the local clock time is adjusted according to the offset value.

6. The time synchronizing method of claim 5, wherein the offset value is calculated using Equation below:

$$y_k = a_1 y_{k-1} + a_2 y_{k-2} + \ldots + a_n y_{k-n} + b_0 u_k + b_1 u_{k-1} + \ldots + b_m u_{k-m}$$

wherein $a_i$ and $b_i$ denote filter coefficients of a filter transmission function, $y_k$ denotes the time history of the offset, and $u_k$ denotes the time history of the delta time.

7. The time synchronizing method of claim 6, wherein the filter transmission function is expressed as in Equation below:

$$H(z) = \frac{b_0 + b_1 z^{-1} + \ldots + b_m z^{-m}}{1 - a_1 z^{-1} - a_2 z^{-2} \ldots + a_n z^{-n}}$$

wherein $a_i$ and $b_i$ denote the filter coefficients.

8. A time synchronizing apparatus comprising:
   a slave node which generates and transmits a local time stamp based on a free-running local clock, calculates a delta time value based on a response time stamp and digital low pass filter, and adjusts a local clock time based on the delta time value; and
   a master node, which receives the local time stamp from the slave node, generates the response time stamp based on the local time stamp, and transmits the response time stamp to the slave node,
   wherein the delta time value is calculated using at least one of a difference of a time when the master node receives the local time stamp and a time when the local time stamp is transmitted to the master node and a difference of a time when the response time stamp is received from the master node and a time when the master node transmits the response time stamp.

9. The time synchronizing apparatus of claim 8, wherein the local time stamp transmitted from the slave node comprises a time when the local time stamp is transmitted to the master node.

10. The time synchronizing apparatus of claim 8, wherein the response time stamp comprises a time when the local time stamp is transmitted to the master node, a time when the master node receives the local time stamp, and a time when the master node transmits the response time stamp.

11. The time synchronizing apparatus of claim 8, wherein the delta time value is calculated as in Equation below:

$$U_k = \frac{(T_{2,k}^M - T_{1,k}^S) - (T_{4,k}^S - T_{3,k}^M)}{2}$$

wherein $T_{1,k}^S$ denotes a time when the local time stamp is transmitted to the master node, $T_{2,k}^M$ denotes a time when the master node receives the local time stamp, $T_{3,k}^M$ denotes a time when the master node transmits the response time stamp, and $T_{4,k}^S$ denotes a time when the response time stamp is received from the master node.

12. The time synchronizing apparatus of claim 8, wherein the slave node calculates an offset value using the delta time value and adjusts the local clock time according to the offset value.

13. The time synchronizing apparatus of claim 12, wherein the offset value is calculated using Equation below:

$$y_k = a_1 y_{k-1} + a_2 y_{k-2} + \ldots + a_n y_{k-n} + b_0 u_k + b_1 u_{k-1} + \ldots + b_m u_{k-m}$$

wherein $a_i$ and $b_i$ denote filter coefficients of a filter transmission function, $y_k$ denotes the time history of the offset, and $u_k$ denotes the time history of the delta time.

14. The time synchronizing apparatus of claim 13, wherein the filter transmission function is a function expressed through a combination of the filter coefficients.

15. The time synchronizing apparatus of claim 12, wherein the slave node calculates the delta time value through the digital low pass filter and combines the delta time value with a filter coefficient of the loop filter to calculate the offset value.

* * * * *